3,646,200
TREATMENT OF INFLAMMATION WITH SALICYLIC ACIDS

Tsung-Ying Shen, Bruce E. Witzel, and Gordon L. Walford, Westfield, N.J., assignors to Merck & Co., Inc., Rahway, N.J.
No Drawing. Filed June 25, 1969, Ser. No. 836,640
Int. Cl. A61k 27/00
U.S. Cl. 424—230                        4 Claims

ABSTRACT OF THE DISCLOSURE

New substituted phenoxysalicylic acids and non-toxic pharmaceutically acceptable salts, esters, and amides derived therefrom. The substituted phenoxysalicylic acids disclosed herein have anti-inflammatory, anti-pyretic, and analgesic activity. Also included are methods for preparing said phenoxysalicylic acid compounds.

BACKGROUND OF THE INVENTION

The development of anti-inflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of much simpler structure and having less side effects.

SUMMARY OF THE INVENTION

Generally, this invention relates to new substituted phenoxysalicylic acid compounds and processes for producing the same. These compounds are useful in that they have anti-inflammatory activity and are effective in the prevention and inhibition of edema and granuloma tissue formation. In addition, some of them have a useful degree of anti-pyretic and analgesic activity.

DESCRIPTION AND PREFERRED EMBODIMENTS

This invention relates to new substituted phenoxysalicylic acids and processes for producing the same. More specifically, this invention relates to substituted phenoxysalicylic acids, esters, amides, anhydrides and non-toxic pharmaceutically acceptable salts thereof. Still more specifically, this invention relates to compounds having the following general formula:

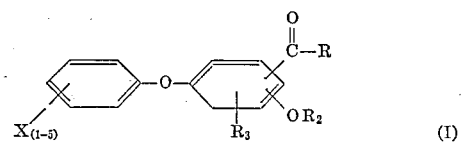

wherein:

R may be hydroxy, amino, loweralkoxy (such as methoxy, ethoxy, butoxy, pentoxy, etc.), loweralkylamino (methylamino, propylamnio, pentylamino, etc.), di(loweralkyl)amino (dimethylamino, dibutylamino, propylpentylamino, etc.), diloweralkylaminoloweralkylamino, diloweralkylaminoloweralkoxy, hydroxyloweralkoxy (3-hydroxypropoxy, 2-hydroxypropoxy, 4 - hydroxybutoxy, etc.), polyhydroxyloweralkoxy (2,3 - dihydroxypropoxy, 2,3,4,5,6 - pentahydroxyhexyloxy, etc.), loweralkoxyloweralkoxy (ethoxyethoxy), phenylloweralkoxy (benzyloxy, phenethoxy, etc.), phenoxy, substituted phenoxy (such as loweralkoxyphenoxy, halophenoxy, diloweralkylaminophenoxy, loweralkanoylaminophenoxy, carboxyphenoxy and carboloweralkoxyphenoxy), hydrazino, morpholino, piperidino, pyrrolidino, hydroxyloweralkylamino, or phenylamino;

$R_2$ may be hydrogen, acyl (preferably loweracyl such as formyl, acetyl, propionyl, butyryl, etc.), alkyl (preferably loweralkyl such as methyl, ethyl, propyl, isopropyl, butyl, pentyl, etc.), or alkoxycarbonyl (preferably loweralkoxycarbonyl such as methoxycarbonyl, ethoxycarbonyl, etc.);

$R_3$ may be hydrogen, halogen (such as chloro, bromo, fluoro, or iodo, preferably fluoro or chloro), haloalkyl (preferably haloloweralkyl such as trifluoromethyl, etc.), alkyl (preferably loweralkyl, such as methyl, ethyl, propyl, isopropyl, butyl, pentyl, etc.), cycloalkyl (cyclopropyl, cyclobutyl, cyclopentyl, cyclohexyl and cycloheptyl etc.), or alkoxy (preferably loweralkoxy such as methoxy, ethoxy, isopropoxy or butoxy); and X may be hydrogen, alkyl (preferably loweralkyl, such as methyl, ethyl, propyl, isopropyl, butyl, pentyl, etc.), hydroxy, alkoxy (preferably loweralkoxy such as methoxy, acetoxy, isopropoxy or butoxy), acyloxy (such as benzoyloxy, acetoxy or propionoxy etc.), halogen (such as chloro, bromo, fluoro or iodo, preferably fluoro or chloro), haloalkyl (preferably haloloweralkyl such as trifluoromethyl, etc.), nitro, amino, alkylamino (preferably loweralkylamino such as methylamino, propylamino, pentylamino, etc.), diloweralkylamino (dimethylamino, dibutylamino, propylpentylamino, etc.), acylamino (preferably loweracylamino such as formylamino, acetylamino, propionylamino, butyrylamino, etc.), mercapto, alkylmercapto (preferably loweralkylmercapto such as methylmercapto, ethylmercapto, etc.), alkylsulfinyl (preferably loweralkylsulfonyl such as methylsulfonyl, ethylsulfonyl, butylsulfinyl, etc.), alkylsulfonyl (preferably loweralkylsulfonyl such as methylsulfonyl, ethylsulfonyl, butylsulfonyl, etc.), sulfonamido, sulfonylamido, alkylaminoalkyl (preferably loweralkylaminoloweralkyl such as methylaminomethyl, ethylaminomethyl, etc.), hydroxyalkyl (preferably hydroxyloweralkyl such as hydroxymethyl, hydroxyethyl, hydroxypropyl, etc.), alkoxyalkyl (preferably loweralkoxyloweralkyl such as methoxymethyl, methoxyethyl, ethoxyethyl, ethoxypropyl, etc.), mercaptoalkyl (preferably mercaptoloweralkyl such as mercaptomethyl, mercaptoethyl, etc.), alkylmercaptoalkyl (preferably loweralkylmercaptoloweralkyl such as methylmercaptomethyl, ethylmercaptoethyl, ethylmercaptopropyl, etc.), cyano, carboxy, carboalkoxy (carbomethoxy, carboethoxy, etc.), carbamoyl, aryl (such as phenyl, tolyl, salicyl), aralkyl such as benzyl, aryloxy or aralkoxy; provided that the $OR_2$ group is always ortho to the

group.

Representative compounds of this invention are:

4-(p,o, or m-fluorophenoxy)-salicyclic acid;
5-(p,o, or m-fluorophenoxy)-salicyclic acid;
4-(p,o, or m-trifluoromethylphenoxy)-salicyclic acid; and
5-(p,o, or m-trifluoromethylphenoxy)-salicyclic acid.

This invention also relates to a method of treating inflammation in patients (animal or human) using a compound of Formula I, particularly an especially preferred compound as the active constituent.

The compounds of the instant invention can be used to treat inflammation by reducing inflammation and relieving pain in such diseases as rheumatoid arthritis, osteoarthritis, gout, infectious arthritis and rheumatic fever.

The compounds of Formula I also have antipyretic and analgesic activity and would be administered and used in the same manner and in the same dosage ranges as if they were being used to treat inflammation as discussed further on.

The treatment of inflammation in accordance with the method of the present invention is accomplished by orally, rectally, parenterally, or topically administering to patients a composition of a compound of this invention particularly the especially preferred compounds in a non-toxic pharmaceutically acceptable carrier, preferably in tablet or capsule form.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, Cab-o-sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup or a liquid suspension. Suppositories for rectal administration and gels for topical administration may be prepared in a conventional manner.

The active compounds of Formula I and of the compositions of this invention are present in an amount sufficient to treat inflammation, that is to reduce inflammation. Advantageously, the composition will contain the active ingredient, namely, the compounds of Formula I in an amount of from about 1 mg. to 100 mg. per kg. body weight per day (50 mg. to 7 g. per patient per day), preferably from about 2 mg. to 50 mg./kg. body weight per day (100 mg. to 3 g. per patient per day).

The method of treatment of this invention comprises internally administering to a patient (animal or human), a compound of Formula I, particularly an especially preferred compound admixed with a non-toxic pharmaceutical carrier such as exemplified above. The compounds of Formula and particularly the especially preferred compounds will be administered in an amount of from 1 mg. to 100 mg./kg. body weight per day, preferably from about 2 mg. to about 50 mg. per kilogram body weight per day and especially from 4 mg. to 20 mg./kg. body weight per day. The most rapid and effective anti-inflammatory effect is obtained from oral administration of a daily dosage of from about 4 to 20 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

The acid compounds of the invention may be prepared by reacting a substituted anisole with a substituted phenol to form a phenoxyanisole. The phenoxyanisole is is then demethylated in a conventional manner to form a phenoxyphenol which is carboxylated in a conventional manner to form a phenoxy salicyclic acid, as for example, by heating the appropriate substituted phenoxyphenol under pressure with carbon dioxide gas. The product can then be isolated from the reaction mixture by methods known in the art. The temperature at which the carboxylation reaction can take place is from 50° to 300° C. The reaction can also take place at from atmospheric pressure to high pressure, preferably however at 200° C. and about 1600 p.s.i. pressure.

The compounds of this invention wherein R is a group such that an ester is the final compound (i.e. R is alkoxy) are prepared by any esterification procedure using an esterifying agent containing the appropriate R group. For example, the carboxylic acid compounds of this invention may be reacted with the appropriate loweralkanol, (preferably methanol) at elevated temperatures in the presence of a strong acid such as hydrochloric acid, sulfuric acid, p-toluene-sulfonic acid and the like to form the desired ester.

The compounds of this invention wherein R is a group such that an amide is the final compound (i.e. R is amino) may be prepared by any suitable amidation reaction. For example, the carboxylic acid compound (preferably the methyl or ethyl ester) may be reacted with ammonia, ammonium hydroxide, or an amine compound, at any suitable temperature (room temperature to reflux). When the amino group is desired, it is preferred to carry out the reaction with ammonia in a bomb at temperatures about 100° C. to form the desired R (amino) compound. Preferably, when an amide is desired which is derived from an amino acid, the following reaction sequence is followed: The carboxylic acid final compound is reacted with isobutyl chlorocarbonate to form the mixed anhydride. This compound is in turn reacted with the desired amino acid ester and subsequently hydrolyzed to form the desired amide.

The salts of the final acid compounds of this invention may be prepared by any of the well-known metathesis procedures. For example, the carboxylic acid compound may be reacted with an inorganic base such as sodium hydroxide, potassium hydroxide, ammonium hydroxide and barium hydroxide and the like. The anhydride of this invention may be prepared by any of the well-known procedures in the art.

The final compound, wherein $R_2$ is lower alkyl (preferably methyl), may be prepared by any appropriate alkylation reaction. For example, the corresponding hydroxy benzoic acid, ester, or amide (preferably the ester), may be reacted with a di(lower alkyl)sulfate (preferably dimethyl sulfate) in the presence of a base (such as an alkali carbonate) at any suitable temperature (room temperature to reflux but preferably at or near reflux) with subsequent acidification of the reaction mixture, such as with hydrochloric acid, sulfuric acid, and the like, to form the desired $R_2$ compound.

The following examples are presented to further illustrate the invention:

EXAMPLE 1

The preparation of 5-(p-chlorophenoxy)-salicylic acid

An intimately ground mixture of 4-(p-chlorophenoxy)-phenol (5 g.) and anhydrous potassium carbonate (15 g.) is heated at 200° C. in a 1200–1400 p.s.i. carbon dioxide atmosphere for 8 hours. The mixture is cooled, added to water (300 ml.), stirred, filtered, and the filtrate acidified with dilute hydrochloric acid to yield 5-(p-chlorophenoxy)-salicylic acid.

EXAMPLE 2

The preparation of 3-chloro-4-phenoxyphenol

To a stirred mixture of water (300 ml.) and concentrated sulfuric acid (30 ml.) is added 3-chloro-4-phenoxyaniline (0.3 m.) in small portions. The resultant mixture is then cooled to less than 10° C. by the addition of crushed ice (250 g.) plus any external cooling needed. A solution of sodium nitrite (22 g.) in water (100 ml.) is added portion-wise so that the temperature stays below 10° C., the mixture allowed to warm to room temperature, heated gently until evolution of nitrogen is completed, and the mixture cooled. Extraction of the mixture with chloroform, followed by chromatography of the extracts on a silica gel column using an ether-petroleum ether system (v./v. 0–50% ether) as eluant yields 3-chloro-4-phenoxyphenol.

When p-(2-chlorophenoxy)aniline, p-(2,4-dichlorophenoxy)-aniline, p-(4-chlorophenoxy)-m-chloroaniline, p-(2-chlorophenoxy)-m-chloroaniline, p-(2,4,6-trichlorophenoxy) aniline, p-(3,4-dimethylphenoxy)-aniline, p-

(4-chloro-3,5-dimethylphenoxy)-aniline, or p-(4-carboxyphenoxy)-aniline is used in place of 3-chloro-4-phenoxyaniline in the above example, the corresponding phenol, p-(2-chlorophenoxy) - phenol, p-(2,4-dichlorophenoxy)-phenol, p-(4-chlorophenoxy)-m-chlorophenol, p-(2-chlorophenoxy)-m-chlorophenol, p-(2,4,6-trichlorophenoxy)-phenol, p-(3,4-dimethylphenoxy)-phenol, p-(4-chloro-3,5-dimethylphenoxy)-phenol or p-(4-carboxyphenoxy)-phenol (purified via the methyl ester) is obtained.

EXAMPLE 3

The preparation of 4-(p-methylphenoxy)-anisole

A mixture of p-bromoanisole (0.15 m.), p-cresol (0.18 m.), powdered anhydrous potassium carbonate (6.9 g.) and copper bronze (0.2 g.) is heated at 210° C. for two hours, cooled, excess alkali added, the mixture extracted well with ether and benzene, the combined extracts dried well over anhydrous magnesium sulfate, filtered and concentrated. Distillation under reduced pressure, or chromatography on a silica gel column of the residue obtained, using an ether-petroleum ether system as eluant yields 4-(p-methylphenoxy)-anisole.

When o-cresol, m-cresol, o-, m-, or p-nitrophenol, m- or p-phenylphenol, 4-hydroxydiphenylmethane, 4-hydroxydiphenylether, 4-hydroxyacetophenone, o-, m-, and p-chlorophenol or o-, m- and p-fluorophenol are used in place of p-cresol in the above example, 4-(o- and m-methylphenoxy)-anisole, 4-(o, m and p-nitrophenoxy)-anisole, 4-(m- and p-phenylphenoxy)-anisole, 4-(p-benzylphenoxy)-anisole, 4-(p-phenoxyphenoxy-anisole, 4-(p-acetylphenoxy)-anisole, 4-(o-, m- and p-chlorophenoxy)-anisole and 4-(o-, m- and p-fluorophenoxy)-anisole are obtained, respectively.

When m-bromoanisole is used in place of p-bromoanisole in the above example, and reacted with all the phenols listed, the corresponding 3-(substituted phenoxy)-anisoles are obtained.

EXAMPLE 4

The preparation of 4-(p-methylphenoxy)-phenol

A mixture of 4-(p-methylphenoxy)-anisole (5 g.) and pyridine hydrochloride (125 g.) under a dry nitrogen atmosphere is placed in an oil-bath set at 230° C., kept there 10 minutes, removed from the bath, cooled, and extracted with ether. The ether extracts are washed with water, dried, and the residue obtained upon removal of the ether chromatographed on a silica gel column using an ether-petroleum ether (v./v. 0–70% ether) system yielding 4-(p-methylphenoxy)-phenol.

Other standard methods of demethylation, such as acetic acid-hydrogen halide, aluminum chloride-benzene, potassium hydroxide-ethylene glycol, etc., may also be used.

When the substituted anisoles of Example 3 are used in place of 4-(p-methylphenoxy)-anisole in the above example, there is obtained 4-(o- and m-methylphenoxy)-phenols, 4-(o-, m-, and p-nitrophenoxy)-phenols, 4-(m- and p-phenylphenoxy)-phenols, 4-(p - benzylphenoxy)-phenol, 4-(p-phenoxyphenoxy)-phenol, 4-(p - acetylphenoxy)-phenol, 4-(o-, m-, and p-chlorophenoxy)-phenols, 4-(o-, m- and p-fluorophenoxy)-phenols, 3-(o-, m-, and 4-(o-, m- and p-methylphenoxy)-phenols, 3-(o-, m-, and p-nitrophenoxy)-phenols, 3-(m- and p-phenylphenoxy)-phenols, 3-(p-benzylphenoxy) - phenol, 3 - (p - phenoxyphenoxy)-phenol, 3-(p-acetylphenoxy)-phenol, 3-(o-, m-, and p-chlorophenoxy)-phenols and 3-(o-, m-, and p-fluorophenoxy)-phenols, respectively.

EXAMPLE 5

When the phenols from Example 4 are used in place of 4-(p-chlorophenoxy)-phenol in Example 1, there are obtained 5-(o-, m-, and p-methylphenoxy)-salicylic acids, 5-(o-, m- and p-nitrophenoxy)-salicylic acids, 5-(m- and p-phenylphenoxy)-salicylic acids, 5-(p - benzylphenoxy)-salicylic acid, 5-(p-phenoxy-phenoxy)-salicylic acids, 5-(p-acetylphenoxy)-salicylic acid, 5-(o- and m-chlorophenoxy)salicylic acids, 5-(o-, m- and p-fluorophenoxy)-salicyclic acids, 4-(o-, m- and p-methylphenoxy)-salicylic acids, 4-(o-, m-, and p-nitrophenoxy)-salicylic acids, 4-(m- and p-phenylphenoxy)-salicylic acids, 4-(p-benzylphenoxy)-salicylic acid, 4-(p-phenoxyphenoxy) - salicylic acid, 4-(p-acetylphenoxy)-salicylic acid, 4-(o-, m- and p-chlorophenoxy)-salicylic acids, and 4-(o-, m- and p-fluorophenoxy)-salicylic acids.

When the phenols from Example 2 are used above, there are obtained 4-chloro-5-phenoxy-salicylic acid, 5-(o-chlorophenoxy)-salicylic acid (prepared above also), 5-(2,4-dichlorophenoxy)-salicylic acid, 4-cholro - 5 - (p-chlorophenoxy)-salicylic acid, 4-chloro-5-(o - chlorophenoxy)-salicylic acid, 5-(2,4,6-trichlorophenoxy)-salicylic acid, 5-(3,4-dimethylphenoxy)-salicylic acid, 5-(4-chloro-3,5-dimethylphenoxy)-salicylic acid, and 5 - (p - carboxyphenoxy)-salicylic acid, respectively.

EXAMPLE 6

The preparation of 2-acetoxy-5-(p-chlorophenoxy)-benzoic acid

To a mixture of 5-(p-chlorophenoxy)-salicylic acid (0.04 ml.) in anhydrous pyridine (15 ml.) is added acetic anhydride (28 ml.) and the resultant mixture heated on the steam cone for 1.5 hours. The mixture is kept free from moisture during this time. On cooling, the mixture is added to a stirred 500 ml. portion of water, the aqueous system extracted well with chloroform, the chloroform extracts washed with 1 N hydrochloric acid, water, and then dried over anhydrous magnesium sulfate. Concentration of the filtered solution yields 2-acetoxy-5-(p-chlorophenoxy)-benzoic acid.

When propionic or butyric anhydride is used in place of acetic anhydride in the above example, the corresponding propionoxy or butyroxy compound is obtained.

When the salicylic acids of Example 5 are used in place of 5-(p-chlorophenoxy)-salicylic acid, above, the corresponding acyloxy benzoic acids are obtained.

EXAMPLE 7

The preparation of methyl 5-(p-chlorophenoxy)-salicylate

To a solution of anhydrous methanol (100 ml.) containing 0.2 g. of anhydrous hydrogen chloride (or one small drop of concentrated sulfuric acid) is added 5-(p-chlorophenoxy)-salicylic acid and the resultant mixture heated under reflux for three hours. The solvent is removed in vacuo, the residual material partitioned between chloroform-dilute sodium bicarbonate solution, and the layers separated. The chloroform layer is dried, filtered, and concentrated in vacuo to leave methyl 5-(p-chlorophenoxy)-salicylate.

When ethanol is used in place of methanol in the above reaction, the corresponding ethyl ester is obtained.

When the salicylic acids of Example 5 are used in place of 5-(p-chlorophenoxy)-salicylic acid in the above example, the corresponding methyl and ethyl esters are obtained.

Esterification is also achieved using diazomethane in methylene chloride solution.

EXAMPLE 8

The preparation of phenyl 5-(p-chlorophenoxy)-salicylate

To a mixture of polyphosphate esters (15 equiv.) in chloroform is added one equivalent each of 5-(p-chlorophenoxy)-salicylic acid and phenol, and the resultant mixture heated gently for 30 minutes. The chloroform mixture is cooled, washed with dilute bicarbonate solution, the chloroform layer dried, filtered and evaporated in vacuo to yield phenyl 5-(p-chlorophenoxy)-salicylate.

When the salicylic acids of Example 5 are used in place of 5-(p-chlorophenoxy)-salicylic acid in the above reaction, the corresponding phenyl esters are obtained.

EXAMPLE 9

The preparation of methyl 5-(p-aminophenoxy)-salicylate

A mixture of methyl 5-(p-nitrophenoxy)-salicylate (0.01 ml.) in methanol-dioxane (1:1) (200 ml.) is reacted with hydrogen at room temperature, 40 p.s.i., in the presence of 10% palladium on carbon (0.3 g.). The mixture is filtered, the cake washed well with methanol, the filtrate evaporated in vacuo, the residue chromatographed on a silica gel column using a methanol-methylene chloride system as eluant (v./v. 0–30% methanol) to yield methyl 5-(p-aminophenoxy)-salicylate.

EXAMPLE 10

The preparation of methyl 5-(p-dimethylaminophenoxy)-salicylate

A mixture of methyl 5-(p-nitrophenoxy)-salicylate (0.012 m.), methanol (150 ml.), glacial acetic acid (2 ml.), 37% formaldehyde (4 ml.) and Raney nickel (0.5 teaspoonful) is treated with hydrogen (40 p.s.i.) at room temperatrue. When hydrogen uptake is complete, the mixture is filtered, the cake washed with fresh methanol, filtered and the filtrates combined. The mixture is then partitioned between chloroform-dilute sodium bicarbonate solution, the layers separated, the aqueous solution extracted with fresh chloroform and then with ether, the organic layers combined, dried, filtered, and concentrated. Chromatography of the residue on a silica gel column using an ether-petroleum ether (v./v. 0–100 %ether( system yields methyl 5-(p-dimethylaminophenoxy)-salicylate.

EXAMPLE 11

The preparation of methyl 5-(p-cyanophenoxy) salicylate

A mixture of methyl 5-(p-chlorophenoxy)-salicylate (0.02 m.), cuprous cyanide (0.03 m.), and N-methylpyrrolidone is de-aerated, covered with a nitrogen atmosphere and heated slowly to 180° C., kept at this temperature for 3 hours, allowed to cool, partitioned between benzene-7% hydrochloric acid containing ferric chloride (0.03 m.), the benzene layer separated, dried, concentrated and the residue chromatographed on a silica gel column using an ether-petroleum ether system as eluant (v./v. 5–50% ether) to yield methyl 5-(p-cyanophenoxy)-salicylate.

EXAMPLE 12

The preparation of 5-(p-carbamylphenoxy) salicyclic acid

A mixture of 5-(p-cyanophenoxy)-salicylic acid (0.002 m.) and polyphosphoric acid (5 ml.) is heated on a steam cone for one hour, cooled, added to water, the aqueous layer basified with sodium bicarbonate, heated on the steam cone to hydrolyze any ester or anhydride formed, filtered and acidified with dilute hydrochloric acid. The 5-(p-carbamylphenoxy)-salicylic acid is then collected.

EXAMPLE 13

The preparation of methyl 5-(p-carbomethoxyphenoxy)-salicylate

When 5-(p-carboxyphenoxy)-salicylic acid is esterified as per the conditions of Example 7, there is obtained methyl 5-(p-carbomethoxyphenoxy)-salicylate.

EXAMPLE 14

The preparation of methyl 5-(p-benzyloxyphenoxy)-o-anisate

When p-benzyloxyphenol and methyl 5-bromo-o-anisate are used in place of p-cresol and p-bromoanisole, respectively, in Example 3, methyl 5-(p-benzyloxyphenoxy)-o-anisate is obtained.

EXAMPLE 15

The preparation of methyl 5-(p-hydroxyphenoxy)-o-anisate

A mixture of methyl 5-(p-benzyloxyphenoxy)-o-anisate (0.01 m.), methanol (200 ml.) and 10% palladium on carbon (0.2 g.) is reacted in a hydrogen atmosphere (40 p.s.i.) at room temperature. When the theoretical amount of hydrogen has been absorbed, the mixture is filtered and the solvent removed in vacuo to yield methyl 5-(p-hydroxyphenoxy)-o-anisate.

EXAMPLE 16

The preparation of methyl 5-(p-hydroxyphenoxy) salicylic acid

When either of the compounds of Example 15 is reacted with pyridine hydrochloride as per Example 4, methyl 5-(p-hydroxyphenoxy)-salicylic acid is obtained.

EXAMPLE 17

The preparation of 2-acetoxy-5-(p-acetoxyphenoxy) benzoic acid

When 5-(p-hydroxyphenoxy)-salicylic acid is reacted with excess acetic anhydride as per Example 6, 2-acetoxy-5-(p-acetoxyphenoxy)-benzoic acid is obtained.

When 5-(p-aminophenoxy)-salicylic acid is used, 2-acetoxy-5-(p-acetamidophenoxy)-benzoic acid is obtained. Mild basic hydrolysis of this yields 5-(p-acetamidophenoxy)-salicylic acid.

When p-(p-hydroxyphenoxy)-benzoic acid is used, p-(p-acetoxyphenoxy)-benzoic acid is obtained.

EXAMPLE 18

The preparation of p-(4-acetoxyphenoxy) benzotrifluoride

A stainless steel lined shaker is charged with p-(p-acetoxyphenoxy)-benzoic acid (0.02 m.) under a nitrogen atmosphere, the system cooled to Dry-Ice temperatures, and sulfur tetrafluoride (0.1 m.) condensed into the tube. The mixture is then heated at 120° C. for eight hours, cooled, vented, the residual material taken up in ether, filtered, and concentrated. The material thus obtained is then chromatographed on a silica gel column using an ether-petroleum ether (v./v. 0–30% ether) system as eluant, yielding p-(4-acetoxyphenoxy)benzotrifluoride.

Gentle heating of this material in a methanolic solution with either an acid or basic catalyst, followed by ether extraction of the diluted (water) mixture yields p-(p-hydroxyphenoxy)-benzotrifluoride.

EXAMPLE 19

The preparation of 5-(p-trifluoromethylphenoxy)-salicylic acid

When p-(p-hydroxyphenoxy)-benzotrifluoride is used in place of p-(4-chlorophenoxy)-phenol in Example 1, there is obtained 5-(p-trifluoromethylphenoxy)-salicylic acid.

EXAMPLE 20

The preparation of 5-(p-methoxyphenoxy)-o-anisic acid

To a mixture of methyl 5 - (p-hydroxyphenoxy)-o-anisate (0.01 m.) in 2 N sodium hydroxide solution is added dimethyl sulfate (0.03 m.) in small portions over two hours, the mixture being kept basic throughout the addition. Water is added, the mixture filtered, the filtrate acidified and 5 - (p - methoxyphenoxy)-o-anisic acid collected.

EXAMPLE 21

The preparation of 4-hydroxy-4'-mercaptodiphenyl ether

When p-methylmercaptophenol is used in place of p-chlorophenol in Example 1, and the resultant p-(4-methylthiophenoxy)-anisoe demethylated with pyridine hydrochloride as per Example 4, 4 - hydroxy-4'-mercaptodiphenyl ether is obtained.

EXAMPLE 22

The preparation of p-(4-methylmercaptophenoxy)-phenol

A mixture of 4-hydroxy - 4' - mercaptodiphenyl ether (0.01 m.) in a de-aerated aqueous potassium hydroxide solution (0.01 m.) is treated with dimethylsulfate (0.012 m.) at room temperature over one hour, the mixture acidified, extracted well with ether, and the dried extracts chromatographed on a silica gel column using an ether-petroleum ether system (v./v. 0–30% ether) as eluant yielding a p-(4-methylmercaptophenoxy)-phenol.

EXAMPLE 23

The preparation of 5-(p-methylmercaptophenoxy)-salicylic acid

When p-(4-methylmercaptophenoxy)-phenol is used in place of p-(4-chlorophenoxy)-phenol in Example 5, 5-(p-methylmercaptophenoxy)-salicylic acid is obtained.

EXAMPLE 24

The preparation of 5-(p-mercaptophenoxy)-salicylic acid

When the salicylic acid from Example 23 is used in place of methyl 5-(p-hydroxyphenoxy)-o-anisate in Example 16, there is obtained 5 - (p-mercaptophenoxy)-salicylic acid.

EXAMPLE 25

The preparation of 5-(p-methylsulfinylphenoxy)-salicylic acid

To a cooled solution of 5-(p-methylthiophenoxy)-salicylic acid (0.01 m.) in methanol-acetone is added a solution of sodium metaperiodate (0.01 m.) in a minimum amount of water, and the mixture stirred at or below room temperature until precipitation of sodium iodate is completed. The iodate is removed by filtration, the solvents removed in vacuo, and the residue taken up in chloroform and ether, the organic solvents combined, dried and concentrated. Purification is affected via column chromatography of the methyl ester, or by recrystallization of the acid, yielding 5-(p-methylsulfonylphenoxy)-salicylic acid.

EXAMPLE 26

The preparation of 5-(p-methylsulfonylphenoxy)-salicylic acid

When two equivalents of sodium metaperiodate are used in Example 25, and a higher temperature employed, or when the methylmercapto compound is oxidized with peroxide in acetic acid there is obtained 5-(p-methylsulfonylphenoxy)-salicylic acid.

EXAMPLE 27

The preparation of methyl 2-acetoxy-5-(p-bromomethylphenoxy)-benzoate

A mixture of methyl 5-(p-methylphenoxy)-2-acetoxybenzoate (prepared from the corresponding acid and diazomethane) (0.05 m.), N-bromosuccinimide (0.05 m.) (purified just before use by pumping out at 0.5 mm. over $P_2O_5$), carbon tetrachloride (500 ml.) and dibenzoyl peroxide (0.002 m.) is refluxed gently for 3 hours, cooled, the succinimide removed by filtration, and the solvent removed in vacuo to yield methyl 2-acetoxy-5-(p-bromomethylphenoxy)-benzoate.

EXAMPLE 28

The preparation of methyl 5-(p-hydroxymethylphenoxy)-salicylate

A mixture of methyl 2-acetoxy-5-(p-bromomethylphenoxy)-benzoate (0.01 m.), silver acetate (0.01 m.) and acetic acid (30 ml.) is heated gently for three hours, cooled, filtered, and the filtrate concentrated in vacuo to a residue of crude methyl 2 - acetoxy-5-(p-acetoxymethylphenoxy)-benzoate. Anhydrous methanol (50 ml.) and p-toluene sulfonic acid (0.3 g.) added. the mixture refluxed for three hours, concentrated, distributed between water-chloroform, the chloroform layer dried, concentrated, and the contents chromatographed on a silica gel column using an ether-petroleum ether system (v./v. 0–100% ether) as eluant yielding methyl 5-(p-hydroxymethylphenoxy)-salicylate.

When potassium thioacetate is used in place of silver acetate in the above reaction, methyl 5-(p-mercaptomethylphenoxy)-salicylate is obtained.

EXAMPLE 29

The preparation of methyl 5-(p-methoxymethylphenoxy)-salicylate

Methyl 2 - acetoxy - 5 - (p-bromomethylphenoxy)-benzoate (0.01 m.) is added to a stirred solution of sodium methoxide (0.02 m.) in anhydrous methanol, the mixture refluxed gently for one hour, cooled, a trace of dilute hydrochloric acid added to neutralize the mixture, the solvents removed in vacuo, and the residue chromatographed on a silica gel column using an ether-petroleum ether system (v./v. 0–40% ether) as eluant to yield methyl 5-(p-methoxymethylphenoxy)-salicylate.

When potassium methylmercaptide is used in place of sodium methoxide, methyl 5-(p-methylthiomethylphenoxy)-salicylate is obtained.

EXAMPLE 30

The preparation of methyl 5-(p-aminomethylphenoxy)-salicylate hydrochloride

Methyl 5-(p-cyanophenoxy)-salicylate (0.005 m.) in acetic acid (50 ml.) is reduced at room temperature under a 40 p.s.i. hydrogen atmosphere, using 0.2 g. platinum oxide as a catalyst. When the theoretical amount of hydrogen is consumed, the mixture is filtered, the solvent removed in vacuo, the residue taken up in a chloroform-ether mixture, filtered, ethereal-hydrogen chloride added and the methyl-5-(p-aminomethylphenoxy)-silicylate hydrochloride collected.

EXAMPLE 31

The preparation of methyl 5-(p-dimethylaminophenoxy)-salicylate

A mixture of methyl 5-(p-aminomethylphenoxy)-salicylate (0.004 m.), 37% formaldehyde (6 ml.), dried 1,2-dimethoxyethane (80 ml.), glacial acetic acid (50 ml.) and Raney nickel (1 teaspoon) is treated with hydrogen (40 p.s.i.) at room temperature. When hydrogen uptake is completed, the mixture is filtered, the cake washed well with fresh dimethoxyethane, the combined filtrates distributed between chloroform-dilute sodium bicarbonate solution, the chloroform layer dried, filtered, concentrated, and the residue chromatographed on a silica gel column using an ether-petroleum ether system (v./v. 0–100% ether) as eluant ethyl 5-(p-dimethylaminophenoxy)-salicylate is obtained.

EXAMPLE 32

The preparation of 5-(p-benzyloxyphenoxy)-salicylic acid

A mixture of 5-(p-hydroxyphenoxy)-salicylic acid (0.01 m.), anhydrous potassium carbonate (0.02 m.) and anhydrous methanol (50 ml.) is stirred for 30 minutes, protected by a calcium chloride drying tube. Benzyl chloride (0.02 m.) is added, the mixture refluxed for 6 hours, potassium hydroxide (2 g.) and water (100 ml.) added, the mixture refluxed one hour, filtered cold, acidified with dilute hydrochloric acid, the acid collected and purified via recrystallization or column chromatography of its methyl ester to yield 5-(p-benzyloxyphenoxy)-salicyclic acid.

EXAMPLE 33

The preparation of methyl 2-carboxy-4-(p-chlorophenoxy)-phenyl carbonate

To a mixture of 5-(p-chlorophenoxy)-salicylic acid (0.01 m.), dimethylaniline (0.02 m.) and benzene (30 ml.) is added methyl chloroformate (0.011 m.) over one hour with constant shaking and cooling. When the odor of the chlorocarbonate is essentially absent, hydrochloric acid (1 N, 100 ml.) is added and the mixture filtered. The benzene layer is separated, dried, filtered, and the solvent removed in vacuo to yield methyl 2-carboxy-4-(p-chlorophenoxy)-phenyl carbonate.

EXAMPLE 34

The preparation of methyl 4-methyl-5-phenoxy-salicylate

When phenol and methyl 5-bromo-4-methyl-o-anisate are used in place of p-cresol and p-bromoanisole, respectively, in Example 3, and the resulting methyl 4-methyl-5-phenoxy-o-anisate reacted with pyridine hydrochloride as per Example 4, there is obtained methyl 4-methyl-5-phenoxy-salicylate.

EXAMPLE 35

The preparation of 2-bromo-5-methoxybenzotrifluoride

When the acetate of 5-hydroxy-2-bromobenzoic acid is used in place of p-(4-acetoxyphenoxy)-benzoic acid in Example 18, and the resultant mixture hydrolyzed under mild conditions, there is obtained 2-bromo-5-hydroxybenzo trifluoride, which on treatment with diazomethane yields 2-bromo-5-methoxybenzotrifluoride.

EXAMPLE 36

The preparation of 4-benzyloxy-2-bromoanisole

When 3-bromo-4-methoxyphenol is reacted with one equivalent of benzyl chloride as per Example 32, there is obtained 4-benzyloxy-2-bromoanisole.

EXAMPLE 37

The preparation of 5-methoxy-2-phenoxybenzotrifluoride and 4-benzyloxy-2-phenoxyanisole When 2-bromo-5-methoxybenzotrifluoride and 4-benzyloxy-2-bromoanisole are reacted with phenol as per Example 34, there are obtained 5-methoxy-2-phenoxybenzotrifluoride and 4-benzyloxy-2-phenoxyanisole, respectively.

EXAMPLE 38

The preparation of 4-phenoxy-3-trifluoromethylphenol

When 5-methoxy-2-phenoxybenzotrifluoride is demethylated as per Example 4, 4-phenoxy-3-trifluoromethylphenol is obtained.

EXAMPLE 39

The preparation of 4-methoxy-3-phenoxyphenol

When 4-benzyloxy-2-phenoxyanisole is used in place of methyl 5-(p-benzyloxyphenoxy)-o-anisate in Example 15, there is obtained 4-methoxy-3-phenoxyphenol.

EXAMPLE 40

The preparation of 5-phenoxy-4-trifluoromethylsalicylic acid and 5-methoxy-4-phenoxysalicylic acid When 4-phenoxy-3-trifluoromethylphenol and 4-methoxy-3-phenoxyphenol are carbonated as per Example 1, there are obtained 5-phenoxy-4-trifluoromethylsalicylic acid and 5-methoxy-4-phenoxysalicylic acid, respectively.

EXAMPLE 41

The preparation of 5-(p-chlorobenzoxysalicylanilide

A mixture of phenyl 5-(p-chlorophenoxy)-salicylate (0.1 m.), aniline (0.1 m.) and 1-methylnaphthalene (50 ml.) is heated slowly to 230° C., kept at this temperature until phenol has stopped distilling, charcoal (2 g.) added, then 20 ml. additional methylnaphthalene, the mixture heated 10 minutes, filtered hot, and cooled. The collected anilide is then recrystallized to yield pure 5-p-chlorophenoxysalicylanilide.

EXAMPLE 42

The preparation of 5-(p-chlorophenoxy)-salicylamide

A mixture of methyl 5 - (p-chlorophenoxy)-salicylate and concentrated ammonium hydroxide (five-fold excess) is heated at 100° C., in a sealed tube for 6 hours. After cooling, water is added and the 5-(p-chlorophenoxy)-salicylamide collected.

When monomethylamine, dimethylamine, ethylamine, diethylamine, morpholine, piperidine, etc. are used in place of ammonium hydroxide, the corresponding amides are obtained.

EXAMPLE 43

The preparation of N,N-diethylaminoethyl 5-(p-chlorophenoxy)-salicylate

To a mixture of 5-(p-chlorophenoxy)-salicyclic acid (0.01 m.) and N,N-diethylethanolamine (0.01 m.) in anhydrous tetrahydrofuran (100 ml.) is added a solution of dicyclohexylcarbodiimide (0.01 m.) in a minimum of the same solvent. The mixture is stoppered, shaken well, and allowed to stand overnight. The precipitated dicyclohexylurea is removed by filtration, the filtrate concentrated in vacuo, the residue partitioned between ether and 1 N hydrochloric acid, the layers separated, the aqueous layer washed once with fresh ether and neutralized with saturated sodium bicarbonate solution. Extraction with chloroform, followed by removal of the chloroform in vacuo (high vacuum pump to remove traces of starting amine) yields N,N-diethylaminoethyl 5-(p-chlorophenoxy)salicylate.

EXAMPLE 44

The preparation of sodium 5-(p-chlorophenoxy)-salicylate

Solutions of 5-(p-chlorophenoxy)-salicyclic acid in methanol and sodium hydroxide (1 equivalent) in water are mixed, heated for solution, filtered, and the filtrate concentrated in vacuo to leave sodium 5-(p-chlorophenoxy)-salicylate.

When potassium hydroxide is used in place of sodium hydroxide in the above example, the corresponding potassium salt is obtained.

When two equivalents of the above bases are used, the corresponding di sodio- and di potassio- salts are obtained.

EXAMPLE 45

The preparation of the diethylaminoethanol salt of 5-(p-chlorophenoxy)-salicyclic acid N,N-diethylethanolamine (0.001 m.) in ether (5 ml.) is added to a stirred solution of 5-(p-chlorophenoxy)-salicyclic acid (0.001 m.) in chloroform-methanol, the resultant mixture allowed to stir for one hour, the salt collected or the solvent removed in vacuo to yield the diethylaminoethanol salt of 5-(p-chlorophenoxy)-salicyclic acid.

When piperidine, morpholine, triethylamine, N-methylpiperidine, N-methylmorpholine, tributyl amine or other organic amines are used in place of diethylethanolamine in the above example, the corresponding salt is obtained.

We claim:

1. A method of treating inflammation which comprises administering to a patient 1 mg. to 100 mg. per kg. body weight per day of a compound of the formula:

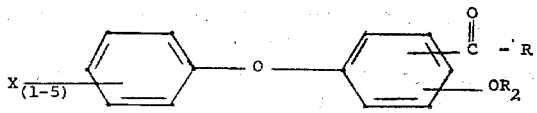

wherein
X is halogen, haloloweralkyl, loweralkoxy or diloweralkylamino;
R is hydroxy;
$R_2$ is hydrogen;
$R_3$ is hydrogen and the pharmaceutically non-toxic acid addition salts thereof provided that the $OR_2$ group is always ortho to the

group and provided the phenoxy radical is attached to the 4 or 5-position of the salicyclic acid moiety.

2. A method of treatment according to claim 1 wherein the compound to be administered is 5-(p-fluorophenoxy)-salicyclic acid.

3. A method of treatment according to claim 1 wherein the compound to be administered is 4-(p,o or m-fluorophenoxy)-salicyclic acid.

4. A method of treatment according to claim 1 wherein the compound to be administered is 5-(m or o-fluorophenoxy)-salicyclic acid.

References Cited

UNITED STATES PATENTS

| 3,105,090 | 9/1963 | Leonard | 260—520 |
| 3,385,886 | 5/1968 | Nicholson et al. | 424—317 |
| 3,228,831 | 1/1966 | Nicholson et al. | 424—317 |

FOREIGN PATENTS

| 966,479 | 8/1964 | Great Britain | 260—520 |

STANLEY J. FRIEDMAN, Primary Examiner

U.S. Cl. X.R.

260—520

UNITED STATES PATENT OFFICE
CERTIFICATE OF CORRECTION

Patent No. 3,646,200          Dated  February 29, 1972

Inventor(s) Tsung-Ying Shen; Bruce E. Witzel & Gordon L. Walford

It is certified that error appears in the above-identified patent and that said Letters Patent are hereby corrected as shown below:

In Column 1, line 59, the word "propylamnio" should be ---propylamino---;

In Column 2, line 30, the words "loweralkylsulfonyl"; "methylsulfonyl" and "ethylsulfonyl" should be ---loweralkylsulfinyl---; ---methylsulfinyl--- and ---ethylsulfinyl---, respectively;

In Column 6, line 25, "(0.04 ml.)" should be ---(0.04 m.)--- and

In Column 13, line 10, the formula reading "$\overset{O}{\underset{C}{\|}}-R$" should be ---$\overset{O}{\underset{C}{\|}}-R$---.

Signed and sealed this 15th day of August 1972.

(SEAL)
Attest:

EDWARD M. FLETCHER, JR.            ROBERT GOTTSCHALK
Attesting Officer                  Commissioner of Patents